(12) United States Patent
Thurre et al.

(10) Patent No.: US 10,843,279 B2
(45) Date of Patent: Nov. 24, 2020

(54) ROTARY KNIFE FOR MACHINE FOR PRODUCING PACKAGING AND METHOD USING SAID KNIFE

(71) Applicant: AISAPACK HOLDING SA, Vouvry (CH)

(72) Inventors: Sébastien Thurre, Choéx (CH); Christophe Stahl, Blonay (CH); Didier Ferrin, Le Bouveret (CH)

(73) Assignee: AISAPACK HOLDING S.A., Vouvry (CH)

( * ) Notice: Subject to any disclaimer, the term of this patent is extended or adjusted under 35 U.S.C. 154(b) by 0 days.

(21) Appl. No.: 16/321,283

(22) PCT Filed: Jul. 21, 2017

(86) PCT No.: PCT/IB2017/054432
§ 371 (c)(1),
(2) Date: Jan. 28, 2019

(87) PCT Pub. No.: WO2018/020379
PCT Pub. Date: Feb. 1, 2018

(65) Prior Publication Data
US 2019/0168318 A1    Jun. 6, 2019

(30) Foreign Application Priority Data

Jul. 26, 2016 (EP) ..................................... 16181260

(51) Int. Cl.
*B23D 21/04* (2006.01)
*B26D 1/60* (2006.01)
(Continued)

(52) U.S. Cl.
CPC ............. *B23D 21/04* (2013.01); *B23D 25/04* (2013.01); *B26D 1/60* (2013.01); *B26D 3/16* (2013.01); *B26D 5/02* (2013.01)

(58) Field of Classification Search
CPC .......... B23D 21/04; B23D 25/04; B26D 1/60; B26D 3/16
See application file for complete search history.

(56) References Cited

U.S. PATENT DOCUMENTS 3,843,758 A    10/1974  Maroschak
4,213,357 A *  7/1980  Lively .................... B23D 21/04
                                                    82/113
(Continued)

FOREIGN PATENT DOCUMENTS

CH    633 742       12/1982
CH    633 742 A5    12/1982
(Continued)

OTHER PUBLICATIONS

First Office Action issued in Chinese Application No. 201780046232.2, dated Jan. 2, 2020, and English translation.
(Continued)

*Primary Examiner* — Omar Flores Sanchez
(74) *Attorney, Agent, or Firm* — Nixon & Vanderhye P.C.

(57) ABSTRACT

The device for cutting individual tubes from a continuous tubular product moving in translation in an uninterrupted manner and formed by a production machine, comprises at least one frame that is stationary relative to the machine, an assembly that is movable in translation relative to the frame and supports a cutting head moved in reciprocating linear translation and in rotation, a first mechanism for moving said cutting head in reciprocating translation, a second mechanism for rotating said cutting head and a third mechanism for actuating the start and the end of the cutting operation, in which said mechanisms are stationary relative to the frame of the device.

14 Claims, 2 Drawing Sheets

(51) Int. Cl.
  *B26D 3/16*     (2006.01)
  *B23D 25/04*    (2006.01)
  *B26D 5/02*     (2006.01)

(56) References Cited

U.S. PATENT DOCUMENTS

| | | | | |
|---|---|---|---|---|
| 4,430,913 A * | 2/1984 | Williamson | ............ | B23B 5/163 82/59 |
| 4,552,047 A * | 11/1985 | Stroup | ............ | B23D 21/04 82/102 |
| 4,655,109 A * | 4/1987 | Rungger | ............ | B23D 21/04 82/47 |
| 5,097,576 A * | 3/1992 | Kadono | ............ | B23D 21/04 29/33 T |
| 5,342,160 A * | 8/1994 | Nakajima | ............ | B23D 21/04 414/412 |
| 5,467,627 A * | 11/1995 | Smith | ............ | B21H 7/182 72/121 |
| 5,596,914 A * | 1/1997 | Liao | ............ | B23D 21/04 53/442 |
| 5,605,083 A * | 2/1997 | Lupke | ............ | B23B 5/163 82/113 |
| 5,832,797 A * | 11/1998 | Cudnohufsky | ............ | B23B 3/06 82/118 |
| 6,536,315 B1 * | 3/2003 | Yoshioka | ............ | B21D 22/14 82/113 |
| 6,981,437 B2 * | 1/2006 | Ogawa | ............ | B23D 21/04 82/46 |
| 7,811,034 B1 * | 10/2010 | Karow | ............ | B23C 3/007 29/33 T |
| 8,127,644 B2 * | 3/2012 | Rattunde | ............ | B23B 3/26 82/1.11 |
| 9,126,276 B2 * | 9/2015 | Ramfjord | ............ | B23D 21/04 |
| 10,040,212 B2 * | 8/2018 | Tabanelli | ............ | B26D 3/16 |
| 10,166,614 B2 * | 1/2019 | Choi | ............ | B23D 21/00 |
| 2003/0084772 A1 * | 5/2003 | Shen | ............ | B23D 21/04 83/597 |
| 2005/0073069 A1 * | 4/2005 | Haraguchi | ............ | B26D 3/163 264/150 |
| 2005/0115371 A1 * | 6/2005 | Ogawa | ............ | B23D 21/04 82/101 |
| 2010/0031789 A1 * | 2/2010 | Lupke | ............ | B26D 3/16 82/72 |
| 2011/0100638 A1 * | 5/2011 | Ramfjord | ............ | B23D 21/04 166/361 |
| 2014/0000762 A1 | 1/2014 | Fromholz et al. | | |
| 2015/0306780 A1 * | 10/2015 | Tabanelli | ............ | B26D 1/16 83/22 |
| 2016/0039021 A1 * | 2/2016 | Ramfjord | ............ | B23D 21/04 37/343 |
| 2017/0259357 A1 * | 9/2017 | Choi | ............ | B23D 21/00 |
| 2017/0320148 A1 * | 11/2017 | Eisenhardt | ............ | B23D 21/04 |
| 2018/0056408 A1 * | 3/2018 | Coakley | ............ | B23B 5/08 |
| 2018/0193997 A1 * | 7/2018 | Makkonen | ............ | B23K 37/0217 |
| 2018/0207760 A1 * | 7/2018 | Coakley | ............ | B23Q 1/25 |
| 2018/0297129 A1 * | 10/2018 | Johnnie | ............ | B23D 21/04 |
| 2019/0022773 A1 * | 1/2019 | Choi | ............ | B23C 1/12 |
| 2019/0126367 A1 * | 5/2019 | Tripp | ............ | B23B 5/163 |
| 2019/0160604 A1 * | 5/2019 | Weinberg | ............ | B23K 37/0288 |

FOREIGN PATENT DOCUMENTS

| | | |
|---|---|---|
| EP | 2 008 749 A1 | 12/2008 |
| EP | 2 085 169 A1 | 8/2009 |
| FR | 2 972 670 | 9/2012 |
| FR | 2 972 670 A1 | 9/2012 |
| GB | 2 120 591 A | 12/1983 |
| KR | 10-2012-0062045 A | 6/2012 |
| RU | 2009790 C1 | 3/1994 |
| SU | 1655665 A2 | 6/1991 |
| WO | 2015/052338 A1 | 4/2015 |

OTHER PUBLICATIONS

International Search Report for PCT/IB2017/054432, dated Nov. 24, 2017, 4 pages.

Search Report dated Jun. 5, 2020, issued in Russia Application No. 2019103273/05(006010), 2 pages.

Notification of the patentability examination results (English translation) dated Jun. 9, 2020, issued in Russia Application No. 2019103273/05(006010), 6 pages.

* cited by examiner

ROTARY KNIFE FOR MACHINE FOR PRODUCING PACKAGING AND METHOD USING SAID KNIFE

CORRESPONDING APPLICATION

The present application is the U.S. national phase of International Application No. PCT/IB2017/054432 filed Jul. 21, 2017, which designated the U.S. and claims the priority of earlier European application No. EP16181260.7, filed on Jul. 26, 2016 in the name of AISAPACK HOLDING S.A., the entire contents of each of which are hereby incorporated by reference into the present application.

TECHNICAL FIELD AND PRIOR ART

The present invention relates to the field of rotary cutter systems for machines for producing packaging, such as tubes.

Such machines for producing packaging, notably tubes, are known from the prior art.

In such machines, when packaging in the form of tubes is being produced, a continuous tubular product is generally created that needs to be cut to the desired size (length) to form the desired individual packaging, such as a tube. It is therefore necessary to incorporate cutting means into the machine in order at the output thereof to obtain individual tubes of a determined (according to the purpose of said tubes) length. However, because the tubular product is formed continuously without stopping to allow individual tubes to be cut, it is necessary to construct a cutting system which is capable of moving along with the tubular product at the speed thereof and of at the same time cutting the individual tubes from the continuous tubular product without the stopping of the latter.

Tube cutting systems are known in the prior art, for example from publications EP 2 085 169, EP 2 008 749, WO 2015/052338, GB 2 120 591 and KR 20120062045 as technical background.

For example, publication EP 2 085 169 describes a pipe cutting system. More specifically, the system known from that document comprises a table moving linearly in sliding in the direction of travel of the tubular product, this table notably supporting a cutting arm with a cutting tool, the cutting arm being mounted on a pivot axle comprising a drive pinion, said pinion being actuated by a drive device to command the rotation of the arm into a position for cutting the tubular product into tube segments. The system described is nevertheless complicated and comprises numerous elements carried on board the table giving it a high inertia and limiting its accelerations and decelerations in the linear direction, this consequently limiting the rate at which individual tubes cut from the tubular product can be produced.

As a consequence, the known rotary cutting devices are limited in terms of production rate because of the stresses created by the reciprocating linear movement which creates high accelerations. Reducing the on-board mass and therefore the inertia forces is a deciding factor in allowing production rates to be increased.

Publication U.S. Pat. No. 3,843,758 describes a method for manufacturing corrugated tubes used for irrigation. The continuously-formed tube is conveyed to a cutting station in which cutting means are applied and accompany the movement of the tube. In that publication, it is therefore the entirety of the cutting means that is moved, something which is not optimal from the viewpoint of the inertia of the system that has to be moved, accelerated and decelerated, and which consequently is detrimental to the production rate.

Publication CH 633 742 describes a tube cutting device using circular cutters housed with the ability to rotate freely about their respective axis and driven around the tube that is to be cut. Each cutter is housed in a cutter bearing carriage capable of moving radially, connected by a right-angle bracket articulation to a central cylinder capable of effecting an axial movement under the influence of the pressure of a fluid, namely a hydraulic liquid, so that when the cylinder moves axially the carriages move radially. That system is nevertheless complicated and uses a hydraulic liquid to actuate it, something which may present a problem, or even be forbidden, in certain spheres of application of the tubes produced (for example for foodstuffs and other similar products).

Publication FR 2 972 670 describes a method and device for producing parts, such as elongate parts exhibiting symmetry of revolution. The system described comprises a portal frame supporting the entire machining and cutting device. Thus, in a movement parallel to the axis of rotation of the machining/cutting device, which means to say in the direction of travel of the machined product, it is necessary to move the portal frame and, therefore, the entirety of the machining/cutting device. The inertia is therefore as great as it can be, and this has an impact on the production rate of the device described.

SUMMARY OF THE INVENTION

It is an object of the invention to propose a system for cutting individual tubes from a tubular product formed continuously which improves the known methods and devices.

It is another object of the present invention to propose a tube cutting system which performs better than the known systems, notably which limits the number of elements carried on board in order to reduce its inertia, notably in the direction of travel of the tubular product, and so as to allow a high production rate nevertheless.

It is another object of the present invention to propose a cutting system that can easily be operated and adapted to the diameter of the tubular product and also to the length of the tube that is to be cut without major intervention on the production machine.

It is another object of the present invention to propose a cutting system which is capable of mirroring the production rates of the present-day machines, namely high production rates.

It is another object of the present invention to propose a system which can easily compensate for the wearing of the cutting blades, without requiring these to be changed.

It is another object of the present invention to propose a method for cutting individual tubes from a continuous tubular product in uninterrupted linear movement or travel.

In one embodiment, the invention relates to a device for cutting individual tubes from a continuous tubular product in uninterrupted translational movement and formed by a production machine, said device comprising at least a chassis that is fixed with respect to the machine, an assembly that is translationally mobile with respect to the chassis and supports a cutting head driven in reciprocating linear translational movement and in rotational movement, the cutting head comprising at least one cutting blade mounted on a rocker arm, a first mechanism comprising at least a first motor for driving the reciprocating translational movement of the cutting head, a second mechanism comprising at least a second motor for driving the rotational movement of the cutting head, a third mechanism comprising at least a third motor for actuating the start and end of the cutting operation with the cutting blade.

In the cutting device, the mechanisms are fixed in the direction of travel of the tubular product with respect to the chassis of the device so as to limit the number and weight of elements carried on board and therefore limit the inertia. With preference, at least the motors of the three mechanisms are fixed with respect to the chassis of the device.

In one embodiment, the actuating means of the third mechanism are fixed in the direction of travel of the tubular product with respect to the chassis.

In one embodiment, the rocker arm of the cutting head comprises at least one pivot axle and an actuating point; the pivot axle being driven in reciprocating linear translational movement by the first mechanism and in rotational movement by the second mechanism; the actuating point being driven in rotational movement by the third mechanism.

In one embodiment, the device comprises at least one drive-transmitting column connecting the pivot axle and the first and second mechanisms.

In one embodiment, a rotational phase shift between the second mechanism and the third mechanism drives a rotational movement of the rocker arm and of the cutting blade about the pivot axle.

In one embodiment, the second mechanism comprises at least one cutting-head drive column driven in rotational movement by a second motor, the rocker arm and the cutting blade being connected to the drive column by a pivot axle.

In one embodiment, the first mechanism comprises a rack-pinion assembly, the pinion being driven by a first motor.

In one embodiment, the drive column is driven in rotational movement by the second motor via a pulley and a drive belt.

In one embodiment, the actuating point is driven in rotational movement by the third motor via a pulley and a drive belt.

In one embodiment, the invention relates to a machine for producing individual tubes from a continuous tubular product, the machine comprising at least one device as described in the present application.

In one embodiment, the invention relates to a method for cutting individual tubes from a continuous tubular product in uninterrupted translational movement, in which a mobile assembly supporting a cutting head driven in reciprocating linear translational movement and in rotational movement is moved, the cutting head comprising at least one cutting blade on a rocker arm free to rotate about a pivot axle, an actuating point is driven in rotational movement, the start and end of the cutting operation with the cutting blade is actuated by a rotational phase shift of the cutting head and of the actuating point, the mobile assembly is returned to a starting point for a further cutting cycle.

In one embodiment of the method, the translational drive is achieved by a rack-pinion assembly.

In one embodiment of the method, the rotational drive is achieved by a motor acting on a pulley via a toothed belt.

In one embodiment of the method, the phase shift makes it possible to alter the cutting point on the cutting blade and compensate for the wearing of said blade.

Thus, according to the principles of the present invention, in the method according to the invention, the following elements are not carried on board, which means to say they are not in reciprocating linear movement along the axis of travel of the tube and are therefore not displaced:

the rotary drive means;
the actuating means;
the linear drive means.

These drive or actuating means notably comprise a motor.

By contrast, the on-board transmission means have low inertia, notably in the axial direction, which means to say in the direction of the reciprocating linear movement. These on-board means transmit the translational and rotational drive movements to the cutting head. They also allow the transmission of the cutting head actuating movement.

BRIEF DESCRIPTION OF THE DRAWINGS

The present invention will be better understood by virtue of the description of embodiments thereof and from the figures in which.

DETAILED DESCRIPTION

The device according to the invention is notably formed of a fixed part which comprises elements that are heavy and impractical to move, and a mobile part that is lightweight and easy to accelerate and to decelerate to perform the cutting operation on the tubular product being produced.

The device according to the invention comprises translational drive means which are fixed and means for transmitting the translational movement, which are mobile. The transmission means are designed in such a way as to have the lowest possible inertia.

Figure 1:
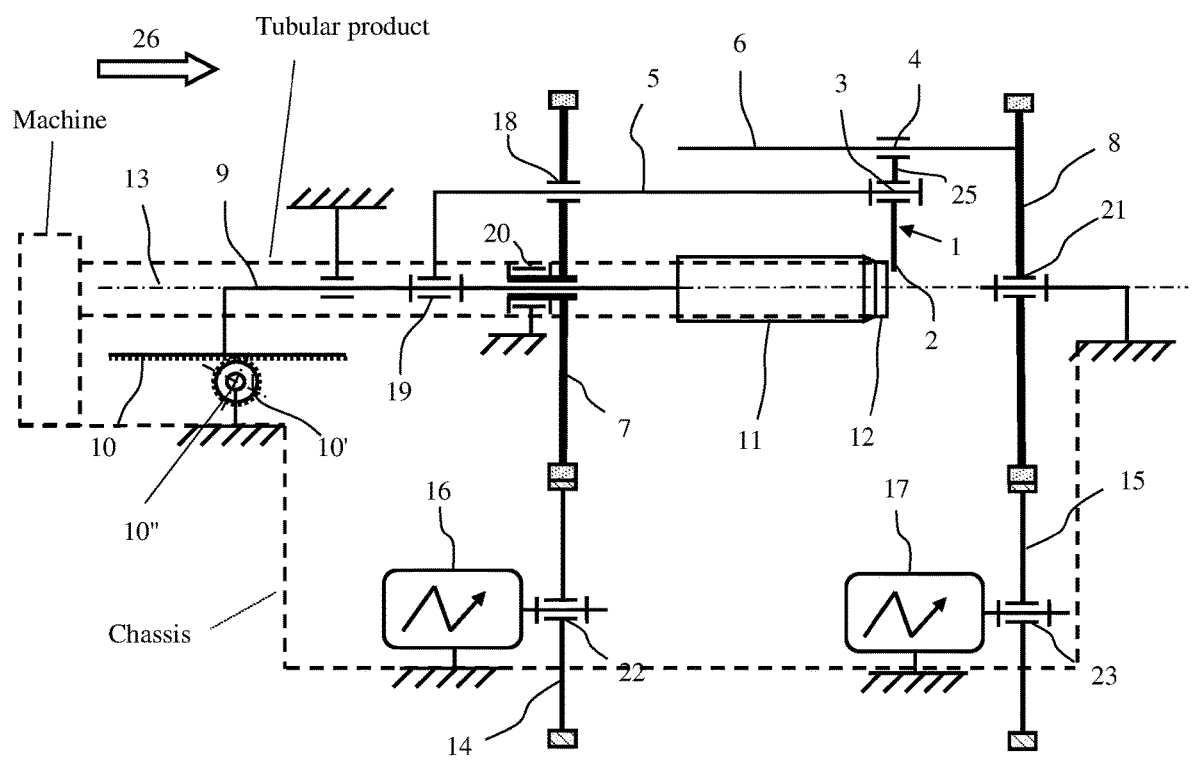
FIG. 1 illustrates a schematic diagram of the invention.
Figure 2:
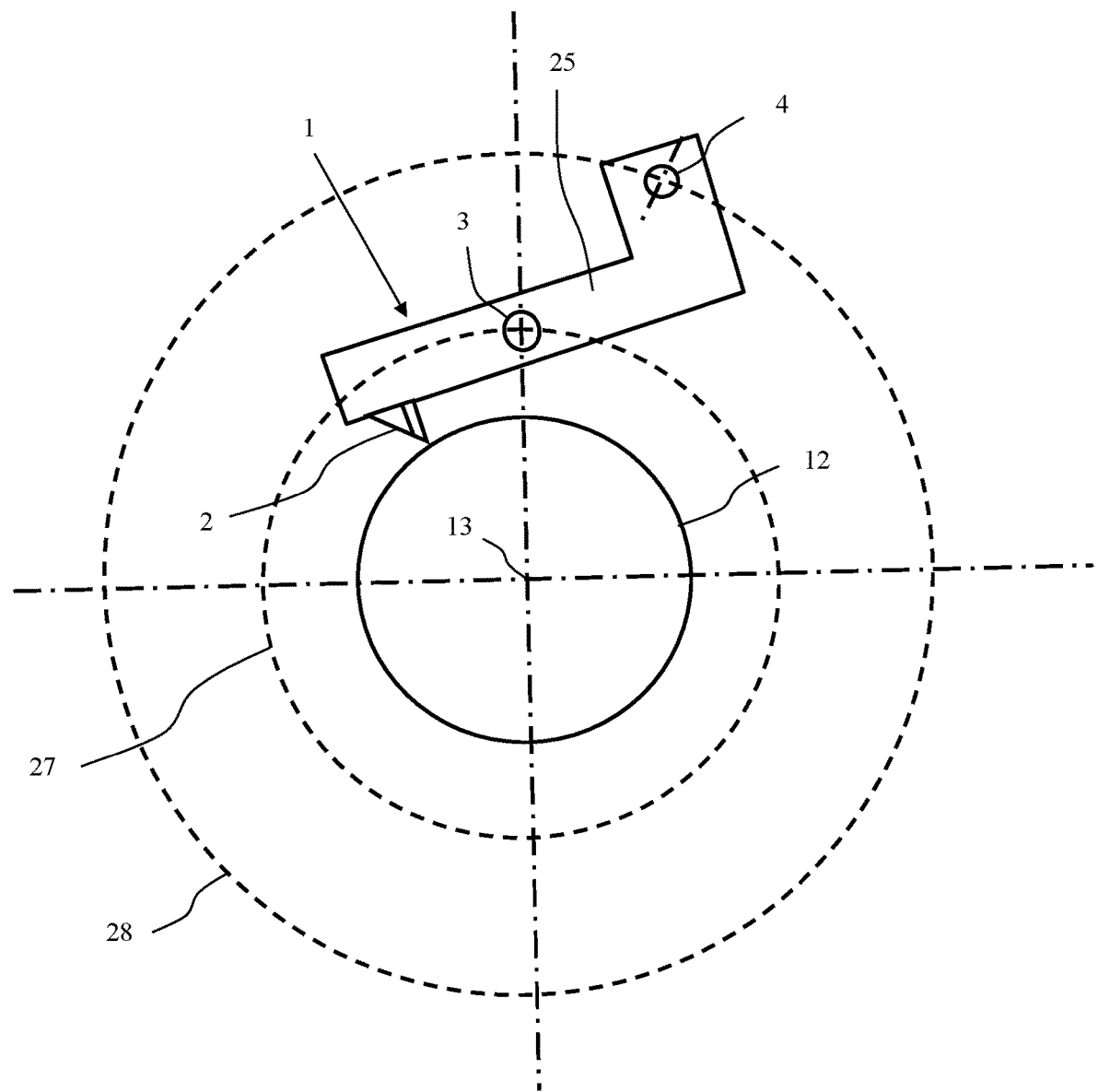
FIG. 2 illustrates a face-on schematic cross sectional view of the cutting system according to the present invention.

More specifically, the device according to the invention and as illustrated in FIGS. 1 and 2 comprises a transmission support 9 which is able to move in translation with respect to the production machine. This translational movement is obtained through a rack 10 and pinion 10' system for example, other equivalent means being possible. For preference, the pinion 10' is driven by a first motor 10", either directly or indirectly, said motor 10" being fixed with respect to the production machine. The translational movement of the support 9 is linear to accompany the movement of a tubular product formed in the machine at the same speed and allow it to be cut in a rotary manner into individual tubes during an uninterrupted translational movement along the longitudinal axis 13 of the tubular product in the direction 26. Once the rotary cut has been made, the cutting means are withdrawn, as will be explained later on in the present description, and the support 9 is returned to a starting position to perform a further tube cutting cycle.

The cutting device according to the present invention further comprises, by way of drive means, a first rotational drive mechanism notably formed of a second motor 16, for example a servomotor, mounted on the machine, of a pulley 7, for example rotated by a belt 14 connected to the motor 16 or other equivalent means, the pulley 7 driving at least one drive transmission column 5, said column 5 sliding in a guide 18 of the pulley 7 thereby allowing its translational movement along the axis 13 of the tubular product. This then allows decoupling of the drive mechanism 14 which is fixed to the machine whereas the rotationally driven transmission column 5 moves with the mobile assembly. It is possible to provide several transmission columns 5, for example two columns or more, so as to stabilize the cutting system.

A transmission column 5 bears cutting means in the form of a cutting head 1 comprising a rocker arm 25 bearing a cutting blade 2, the arm 25 being mounted on the column 5 by a pivot axle 3 allowing the arm and the blade 2 to pivot toward the axis 13 of the tube or away from said axis in order to perform the operation of cutting the individual tubes from the tubular product which is produced continuously. During cutting, the tubular product is guided in the tubular body 11.

The device comprises, by way of drive means, a second drive mechanism 15, also defined hereinafter as an actuating mechanism, comprising a third actuating motor 17, for example a servomotor, mounted on the machine, an actuating pulley 8, said pulley 8 being rotatably driven by the motor 17 for example by means of a belt or other equivalent means, said actuating pulley 8 rotationally driving an actuating point 4 of the arm 25. This actuating point 4 is fixed to an actuating rod 6 and is used to rotate the arm 25 and the cutting blade 2 about its pivot axle 3 as follows: the actuating point 4 is offset with respect to the pivot axle 3, the effect of this being that a relative rotational movement of said actuating point 4 with respect to the pivot axle 3 will cause the rocker arm 25 to rotate about the axle 4 and therefore move closer to (or further away from) the axis of the tube 13. Because the two pulleys 7 and 8 have the same rotation axle which is the axis of the tube 13, a relative offsetting of the actuating point with respect to the pivot axle 3 can be obtained by a relative phase shifting of the pulleys 7 and 8. Thus, this phase shift, which is commanded at the motors 16 and 17, allows the cutting blade 2 to be moved into a position for cutting the tubular product by moving it closer to the axis 13, or withdrawn from the cutting position by moving it away from the axis 13, simply by altering the phase shift of the pulleys 7 and 8 and the ensuing rocking of the arm 25.

FIG. 2 schematically illustrates the tubular product cutting means at the level of the cutting head 1. The rocker arm 25 is mounted on the pivot axle 3 and at one end bears the cutting blade 2. The other end of the arm 25 is connected to the actuating point 4, and as the system rotates, the pivot axle 3 will describe the circle 27 whereas the pivot point 4 will describe the circle 28. As described hereinabove, a relative phase shift between the actuating point 4 and the pivot axle will have the effect of causing the arm 25 to rotate, thereby, depending on the direction of the phase shift, allowing the blade 2 to be brought closer to the axis 13 for cutting the tube, or allowing it to be moved away from the axis.

According to the invention, the way in which the cutting head works can be summarized as follows:

The pivot axle and the actuating point are rotationally driven about the axis of the tube 13. This movement is needed in order to effect the circular cutting of the tube with the cutting blade 2.

The pivot axle 3 and the actuating point 4 are controlled separately.

If their relative position remains constant, there is no radial movement of the cutting blade 2. If their relative positions change, a radial movement of the cutting blade 2 is generated thus allowing the circular cutting of an individual tube during the translational movement at the rate of travel of the tubular product.

The cutting head adjustments are preferably as follows:

Initial radial position of the cutting blade 2 (according to the diameter of the tube): the initial position is adjusted in terms of the relative distance (namely an angular phase shift) between the actuating point 4 and the pivot axle 3.

The cutting depth is adjusted using another value for the angular phase shift between the actuating point 4 and the pivot axle 3.

The angular positions for the start and end of cutting can be altered at any time because the angular position of the pivot axle 3 and that of the actuating point 4 are known at each instant. The phase shift is therefore always capable of being altered. It is therefore easy to adapt the system according to the invention to suit different tube diameters or thicknesses.

The drive transmission columns 5 transmit the linear and rotational movements to the cutting head.

The actuating axle 6 transmits the control of the relative position of the actuating point.

The calibration sleeve 12 holds the tube during cutting and centers the tube with respect to the theoretical axis. The calibration sleeve 12 makes it possible to provide a reference for the cutting depth (the radial position of the blade is altered relative to the sleeve). The calibration sleeve 12 also makes it possible to obtain a cleaner cut by optimizing the axial clearance between the sleeve 12 and the blade 2.

The elements referenced 18 to 23 are guide means, in particular:

18 is a guide bearing longitudinally guiding the column 5 in the pulley 7, for the longitudinal movement of the column 5 during cutting;

19 is a guide bearing guiding rotation of the column 5 on the axis 13 of the tube,

20 is the guide bearing guiding rotation of the pulley 7 on the axis 13 of the tube;

21 is the guide bearing guiding rotation of the pulley 8 on the axis 13 of the tube;

22 is the guide bearing guiding the drive mechanism 14;

23 is the guide bearing guiding the actuating mechanism 15.

The reference 26 indicates the direction of travel of the tubular product.

The method implemented in the machine and according to the invention makes it possible to cut individual tubes without interrupting the formation of the tubular product from which these individual tubes are cut.

In the method according to the invention, individual tubes are cut from a tubular product which has a continuous form and is in uninterrupted translational movement, by performing the following steps the mobile assembly is moved in a translational movement.

the rocker arm with the cutting blade is driven in a rotational movement about the axis of the tubular product, the actuating point is driven in a rotational movement, the start and/or the end of the cutting operation is actuated by a rotational phase shifting of the cutting head and of the actuating point;

once the cut is complete, the mobile assembly is returned to a starting point.

For preference, the translational drive is achieved by a rack-pinion assembly 10, 10', the pinion being fixed to the machine and the rack to the mobile assembly.

The method according to the invention allows an individual printed tubular body to be cut with reference to a mark or a print in a repetitive sequence along the axis of travel of the tubular product.

The method allows the cutting of the individual tubular bodies to be ended very precisely at a position furthest downstream along the axis 13. This invention offers the advantage of simplifying the operations of transferring said tubular bodies onto the mechanisms or structures positioned downstream.

The rotational drive is achieved by a motor acting on a pulley via a toothed belt.

According to the method, the phase shifting also makes it possible to alter the cutting point on the cutting blade and to compensate for the wearing of said blade.

The embodiments of the present invention are given by way of examples and must not be considered to be limiting. Variations are possible within the scope of the claimed protection, notably by employing equivalent means.

The invention claimed is:

1. A device for cutting individual tubes from a continuous tubular product in uninterrupted translational movement and formed by a production machine, the device comprising:
   a chassis that is fixed relative to the machine,
   an assembly that is translationally mobile with respect to the chassis and supports a cutting head driven in reciprocating linear translational movement and in rotational movement, the cutting head including a cutting blade mounted on a rocker arm,
   a first mechanism including a first motor for driving the reciprocating translational movement of the cutting head,
   a second mechanism including a second motor for driving the rotational movement of said cutting head,
   a third mechanism including a third motor for actuating a start and an end of a cutting operation with the cutting blade, and
   wherein the first and second mechanisms are fixed in a direction of travel of the tubular product with respect to the chassis.

2. The device as claimed in claim 1, wherein the third mechanism is also fixed in the direction of travel of the tubular product with respect to the chassis.

3. The device as claimed in claim 1, wherein the rocker arm of the cutting head comprises a pivot axle and an actuating point;
   the pivot axle being driven in reciprocating linear translational movement by the first mechanism and in rotational movement by the second mechanism, and
   the actuating point being driven in rotational movement by the third mechanism.

4. The device as claimed in claim 1, comprising a drive-transmitting column connecting the pivot axle and the first and the second mechanisms.

5. The device as claimed in claim 1, wherein a rotational phase shift between the second mechanism and the third mechanism drives a rotational movement of the rocker arm and of the cutting blade about the pivot axle.

6. The device as claimed in claim 1, wherein the second mechanism comprises a cutting-head drive column driven in rotational movement by a second motor, the rocker arm and the cutting blade being connected to the drive column by a pivot axle.

7. The device as claimed in claim 1, wherein the first mechanism comprises a rack-pinion assembly, said pinion being driven by a first motor.

8. The device as claimed in claim 1, wherein the drive column is driven in rotational movement by the second motor via a pulley and a drive belt.

9. The device as claimed in claim 1, wherein the actuating point is driven in rotational movement by the third motor via a pulley and a drive belt.

10. A machine for producing individual tubes from a continuous tubular product, the machine comprising the w-device as claimed in claim 1.

11. A method for cutting individual tubes from a continuous tubular product in uninterrupted translational movement, wherein the method comprises:
    using the device according to claim 1, for cutting individual tubes from the continuous tubular product in uninterrupted translational movement and formed by the production machine, wherein the device comprises:
    a chassis that is fixed relative to the machine,
    an assembly that is translationally mobile with respect to the chassis and supports a cutting head driven in reciprocating linear translational movement and in rotational movement, the cutting head including a cutting blade mounted on a rocker arm,
    a first mechanism including a first motor for driving the reciprocating translational movement of the cutting head,
    a second mechanism including a second motor for driving the rotational movement of said cutting head,
    a third mechanism including a third motor for actuating a start and an end of a cutting operation with the cutting blade, and
    wherein the first and second mechanisms are fixed in a direction of travel of the tubular product with respect to the chassis,
    moving the assembly supporting the cutting head driven in reciprocating linear translational movement and in a first rotational movement, the cutting head comprising the cutting blade on the rocker arm free to rotate about a pivot axle,
    driving an actuating point in a second rotational movement,
    actuating the start and the end of the cutting operation with the cutting blade, which is actuated by a rotational phase shift of the cutting head and of the actuating point, and
    returning the mobile assembly to a starting point for a further cutting cycle.

12. The method as claimed in claim 11, wherein the translational movement is achieved by a rack-pinion assembly.

13. The method as claimed in claim 11, wherein the first rotational movement and the second rotational movement is achieved by a motor acting on a pulley via a toothed belt.

14. The method as claimed in claim 11, wherein the rotational phase shift allows to alter a cutting point on the cutting blade and compensate for a wearing of the cutting blade.

* * * * *